(12) United States Patent
Ikeda

(10) Patent No.: US 7,025,104 B2
(45) Date of Patent: Apr. 11, 2006

(54) TIRE-USE RUBBER-COVERED FABRIC, PRODUCTION METHOD THEREFOR, PRODUCTION METHOD FOR PNEUMATIC TIRE USING RUBBER-COVERED FABRIC, AND PNEUMATIC TIRE

(75) Inventor: Ikuji Ikeda, Kobe (JP)

(73) Assignee: Sumitomo Rubber Industries, Ltd., Hyogen-ken (JP)

( * ) Notice: Subject to any disclaimer, the term of this patent is extended or adjusted under 35 U.S.C. 154(b) by 254 days.

(21) Appl. No.: 10/399,906

(22) PCT Filed: Jul. 26, 2002

(86) PCT No.: PCT/JP02/07651

§ 371 (c)(1),
(2), (4) Date: Apr. 24, 2003

(87) PCT Pub. No.: WO03/011615

PCT Pub. Date: Feb. 13, 2003

(65) Prior Publication Data

US 2004/0011449 A1    Jan. 22, 2004

(30) Foreign Application Priority Data

Jul. 31, 2001  (JP) .............. 2001-232174
Apr. 11, 2002  (JP) .............. 2002-109472

(51) Int. Cl.
  *B60C 9/02*   (2006.01)
  *B29D 30/44*  (2006.01)
  *B32B 3/02*   (2006.01)

(52) U.S. Cl. .............. 152/556; 152/563; 156/134; 156/906; 428/193; 442/214

(58) Field of Classification Search ........... 156/133, 156/134, 117, 406.4, 906, 907; 152/563, 152/556, 557; 428/57, 58, 111, 193; 442/209, 442/214, 220
See application file for complete search history.

(56) References Cited

U.S. PATENT DOCUMENTS

| 2,217,607 | A | * | 10/1940 | Anderson et al. | ........... 425/367 |
| 3,465,933 | A | * | 9/1969  | George          | ........... 225/97 |
| 3,534,782 | A |   | 10/1970 | Young et al.    | |
| 4,600,045 | A |   | 7/1986  | Dudziak         | |
| 5,062,462 | A | * | 11/1991 | Rye et al.      | ........... 152/548 |

FOREIGN PATENT DOCUMENTS

| JP | 63-38006 A   | 2/1988  |
| JP | 8-80707 A    | 3/1996  |
| JP | 2001-271249 A | 10/2001 |

* cited by examiner

*Primary Examiner*—Geoffrey L. Knable
(74) *Attorney, Agent, or Firm*—Birch, Stewart, Kolasch & Birch, LLP

(57) ABSTRACT

A rubber-coated fabric 10 for a tire, obtained by rubber-coating a rattan blind woven stuff 14 in which wefts 11 and warps 12 made of tire cords 13 are woven into a rattan blind form. The wefts 11 have a break elongation of 4 to 30% and a break strength of 3 to 15 N.

7 Claims, 11 Drawing Sheets

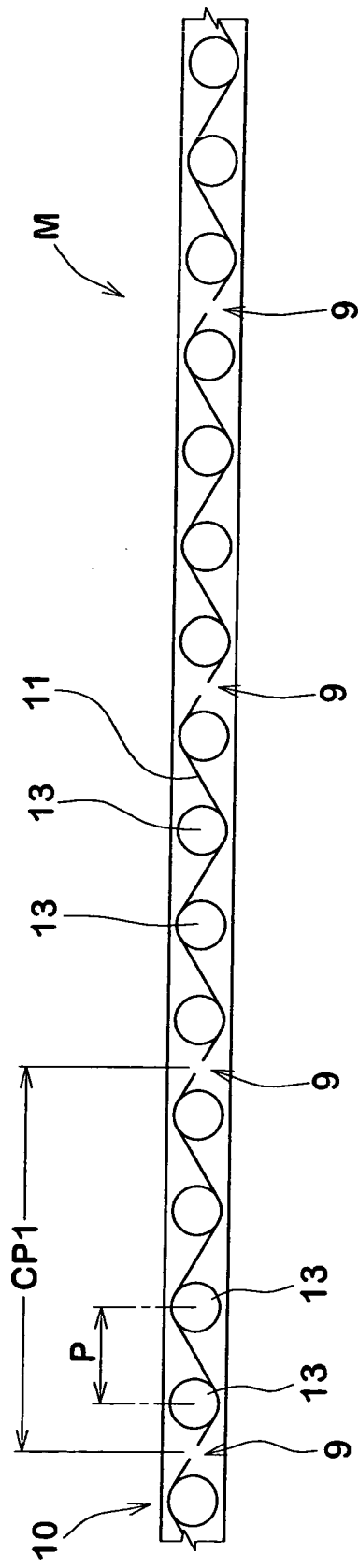
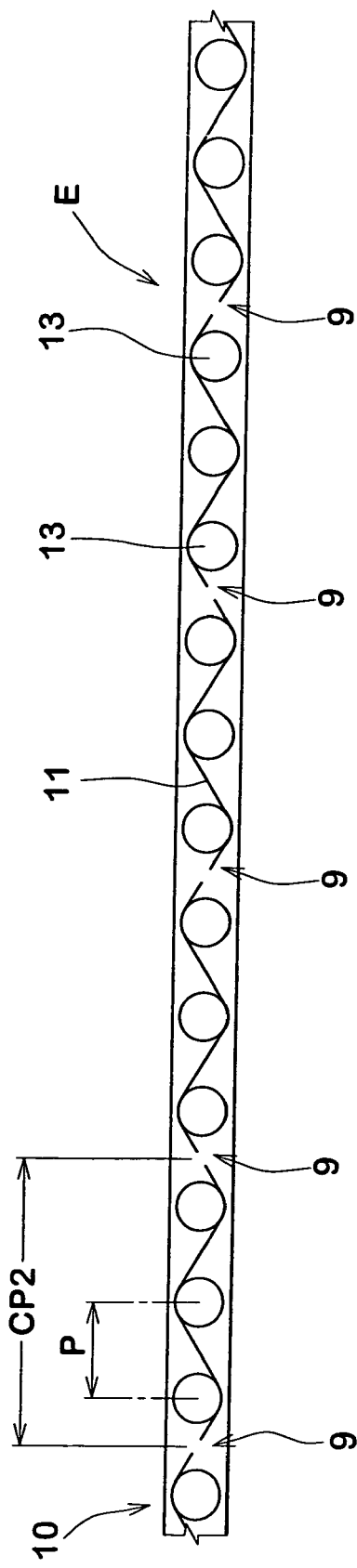

TIRE-USE RUBBER-COVERED FABRIC, PRODUCTION METHOD THEREFOR, PRODUCTION METHOD FOR PNEUMATIC TIRE USING RUBBER-COVERED FABRIC, AND PNEUMATIC TIRE

This application is the national phase under 35 U.S.C. § 371 of PCT International Application No. PCT/JP02/07651 which has an International filing date of Jul. 26, 2002, which designated the United States of America.

TECHNICAL FIELD

The present invention relates to a rubber-coated fabric for a tire which makes it possible to suppress deterioration in the uniformity thereof resulting from joint portions of a carcass ply while keeping the joint strength at the joint portions, so as to improve the appearance quality and the uniformity of the tire, a process for producing the same, a process of using a rubber-coated fabric to produce a pneumatic tire, and a pneumatic tire.

BACKGROUND ART

As illustrated in FIG. 9(A), a carcass ply A of a pneumatic tire is formed using, as an original fabric, a long rubber-coated fabric d wherein a rattan blind woven stuff c obtained by weaving warps a and wefts b made of carcass cords into a rattan blind is coated with a topping rubber g.

Specifically, this rubber-coated fabric d is cut into plural cut pieces d1 at a desired angle θ (about 75 to 90° in a radial tire) to the side-edge of the fabric, and then ends de and de, on the side of the side-edge (on the non-cut side), of the respective cut pieces d1 are successively jointed (primary jointing j1), thereby forming a joint ply f wherein the carcass cords are arranged at the angle θ to the length direction.

As illustrated in FIG. 9(B), this joint ply f is cut into a constant length, which corresponds to one circumference, and the cut piece is wound on a drum along the circumferential direction and then both ends fe and fe thereof along the circumferential direction are jointed with each other (secondary jointing j2), thereby forming the cylindrical carcass ply A.

As illustrated in FIG. 10, in the primary jointing j1 and the secondary jointing j2, the so-called overlap joint is performed wherein the ends de and de, as well as the ends fe and fe, are overlapped with each other and jointed with each other under pressure. At this time, the joint portions j are formed to have a width jw, wherein four or more carcass cords overlap with each other in the vertical direction, in order to keep a necessary joint strength.

However, such an overlap joint has a problem that because of a large rigidity difference between the joint portions j and portions other than them the uniformity is lowered and damaged and further poor appearances called bulges and dents are caused.

In order to decrease the rigidity difference, it is desired that the joint portions j are made to have such a width that the number of overlapping carcass cords a is two or less. However, such joints have insufficient joint strength. Thus, when the carcass ply A is shaped, there arises a problem that the joint portions j are separated and opened. Thus, the manner has not been carried out.

In light of such situations, the present inventor made research. As a result, it has been made evident that the separation (opening) of the joint portions j is affected by the wefts b. That is, the wefts b are made of thin and weak organic fibers, and at the time of shaping the ply, the wefts are stretched in the circumferential direction to generate power in the direction along which the joint portions j are opened. In particular, the break elongation of conventional wefts is as larger as 60 to 150%; therefore, the wefts are elongated rather than cut. As a result, the power in the direction along which the joint portions j are opened is made larger.

The inventor has found out that in the case that the break elongation of the wefts b are restrained to 30% or less and the break strength thereof is restrained into 15 N or less, the wefts b are readily broken by tensile force at the time of the shaping; therefore, even if the number of the overlapping carcass cords a in the joint portions j is set to 2 or less, the joint portions j can be prevented from being separated (opened). At this time, the wefts b are preferably cut at a given pitch before the shaping. For this purpose, as illustrated in FIG. 11, it is preferred to pass the rubber-coated fabric d before primary jointing through a gap n between a pair of comb-teeth form roller r1 and r2 which engage with each other in a convex and concave manner, cause tension to act on the wefts b, and cut the wefts b. In the figure, symbol s represents a cut portion.

From further research by the inventor, it has also made clear that in order to make a further improvement in the uniformity, the cut pitch of the wefts b in side-edge areas E (shown in FIG. 9(A)) of the fabric d is made smaller than the cut pitch in a central area M between the side-edge areas E and E rather than the cut pitch of the wefts b is made constant (even) over the entire width of the fabric d. The reason for this is as follows. In the central area M, the carcass cords a slip out readily from the cut wefts b so as to be free. However, since the wefts b are folded into a lying U-shape in the side-edges of the fabric d, the carcass cords a get entangled to be restrained. As a result, at the time of the shaping of the carcass ply, intervals between the carcass cords are made coarse and minute, thereby producing a bad effect on the uniformity.

As the rattan blind woven stuff c, the following are well known: a woven stuff of a turn type, wherein a single weft b is made continuous; and a woven stuff of a tacking-in type, which is composed of plural tacking-in thread pieces ba wherein both ends of wefts b are terminated at folded portions b3 having a small length, as illustrated in FIG. 9 (A). However, in this tacking-in type woven stuff, the basal portion b1 of the tacking-in thread piece ba and the folded portion b3 overlap with each other so as to make an overlap portion in the side-edge area E. Therefore, in this manner, the strength against break is increased. Additionally, the power of restraining the carcass cords a is higher than that of the turn type. Accordingly, the tendency of the fall in the uniformity gets stronger.

DISCLOSURE OF THE INVENTION

Thus, objects of the present invention are to provide a rubber-coated fabric for a tire which makes it possible to decrease a joint width largely while keeping joint strength in joint portions of a carcass ply, make intervals between carcass cords uniform when the carcass ply is shaped, reduce poor tire appearances such as bulges and dents, and improve the uniformity thereof; a process for producing the same; a process for producing a pneumatic tire using a rubber-coated fabric; and a pneumatic tire.

The first invention of the present inventions is a rubber-coated fabric for a tire, obtained by rubber-coating a rattan blind woven stuff in which wefts and warps made of tire cords are woven into a rattan blind form, characterized in that the wefts have a break elongation of 4 to 30% and a break strength of 3 to 15 N.

In this rubber-coated fabric, the wefts are preferably cut after the rubber-coating is performed, and the cut pitch of the wefts in side-edge areas of the rubber-coated fabric is preferably made smaller than that in the central area thereof. Preferably, the cut pitch of the wefts in the side-edge areas is set to 1 to 4 times the pitch of the embedded tire cords and the cut pitch of the wefts in the central area is set to 3 to 5 times the pitch of the embedded tire cords.

A second invention of the present inventions is a process for producing the rubber-coated fabric wherein wefts are cut after rubber-coating is performed, characterized by comprising a rubber-coating step of coating a rattan blind woven stuff obtained by weaving wefts and warps made of tire cords into a rattan blind form with a rubber, thereby forming a fabric substrate, and a weft-cutting step of cutting the wefts of this fabric substrate with a pushing cutter, wherein in the pushing cutter a pair of comb-teeth form rollers in which rib-form pushing nail portions extending in the circumference direction are arranged at intervals in the axial direction are faced with each other in parallel to each other and in such manner that the pushing nail portions of one of the comb-teeth rollers do not contact the inside of concave portions between the pushing nail portions of the other comb-teeth form roller, whereby the pushing cutter has a gap which is continuous in a convex and concave form in the axial direction between the comb-teeth form rollers, and the fabric substrate is passed, in a direction along which the wefts are parallel to the axial direction of the comb-teeth form rollers, between this gap.

In the comb-teeth form rollers, it is preferred that the width α a of the pushing nail portions in the axial direction and the separate distance β of the pushing nail portions adjacent to each other in the axial direction in both end portions in the axial direction of the rollers are made smaller than the width α and the separate distance β in the central portion thereof, respectively.

A third invention of the present inventions is a process for producing a pneumatic tire wherein the rubber-coated fabric is used as a carcass ply, characterized by comprising a joint ply forming step of primarily-jointing side-edge side ends of cut pieces obtained by cutting the rubber-coated fabric in a direction which crosses the side-edges of the fabric, thereby forming a joint ply, and a carcass ply forming step of winding the joint ply in the circumferential direction on a drum and secondarily-jointing both ends in the circumference direction of this joint ply, thereby forming a cylindrical carcass ply, wherein the wefts are cut before the carcass ply forming step, and in each of the joint portions resulting from the primary jointing and the secondary jointing, not less than three carcass cords do not overlap vertically.

The wefts are preferably cut at a stage where the wefts are in the state of the rubber-coated fabric, and the joint portions are preferably made up to be butt joints obtained by butting and jointing end faces of the respective ends.

A fourth invention of the present inventions is a pneumatic tire characterized by being produced by the production process described as the third invention.

BEST MODES FOR CARRYING OUT THE INVENTION

Figure 1:
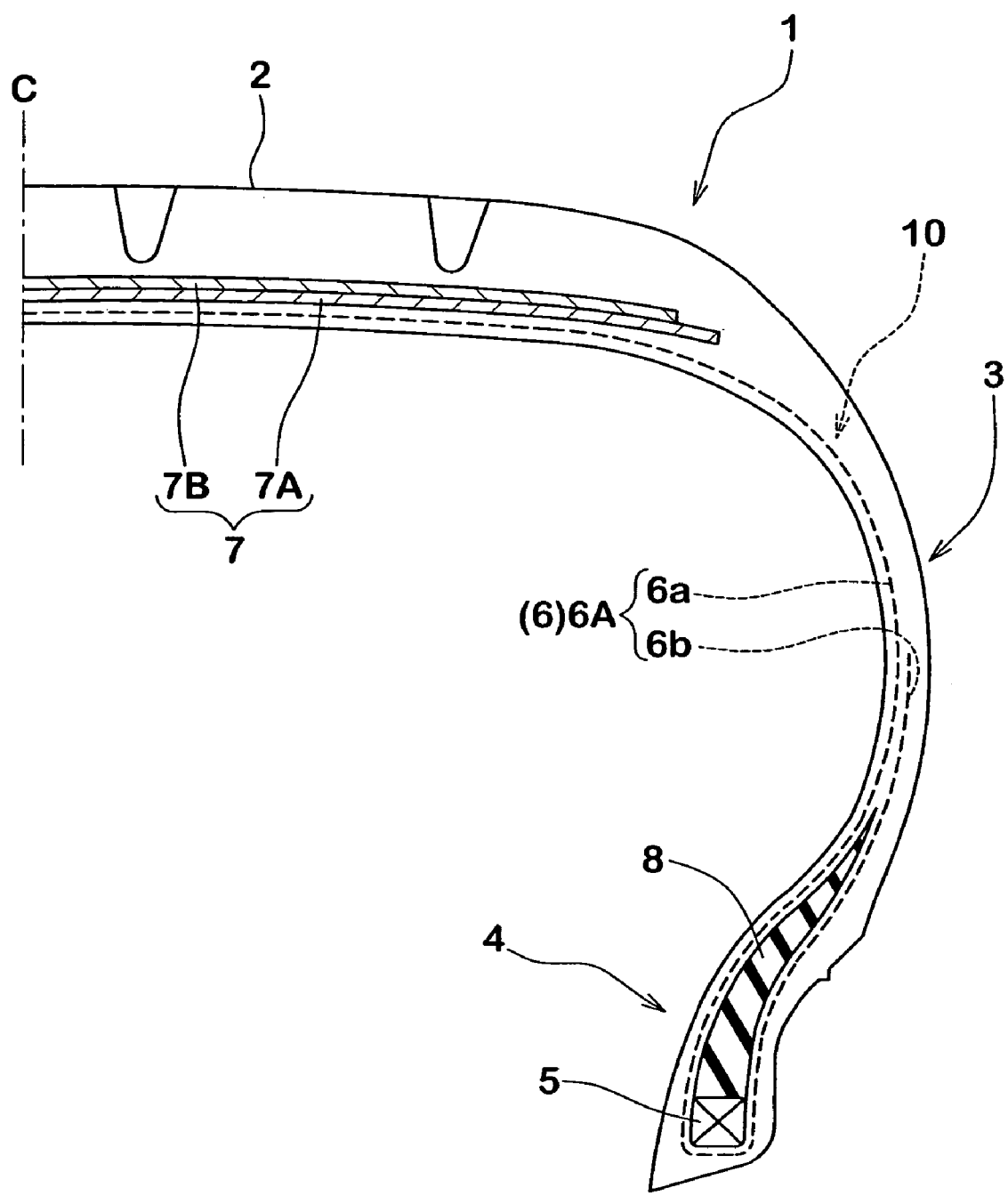
FIG. 1 is a sectional view illustrating a preferred embodiment of a pneumatic tire according to the present invention.

An embodiment of the present invention will be described on the basis of the drawings hereinafter. FIG. 1 is a sectional view of a pneumatic tire 1 of the present embodiment, wherein a rubber-coated fabric is used as a carcass ply.

In FIG. 1, the pneumatic tire 1, which is a radial tire for passenger tires in the present example, has a tread portion 2, a pair of side wall portions 3 extending from the both side of the tread portion inwards in the tire radius direction, and a bead portion 4 positioned at the inner end of each of the side wall portions 3. This pneumatic tire 1 is provided with a carcass 6, in a toroid form, striding over the bead portions 4 and 4, and a belt layer 7 arranged inside the tread portion 2 and outside the carcass 6 in the tire radius direction.

The carcass 6 is made of one or more (one in the present example) carcass plies 6A wherein carcass cords are arranged at an angle of 75° to 90° to the tire circumferential direction. As the carcass cords, organic fiber cords made of nylon, polyester, rayon, aromatic polyamide or the like are adopted.

The carcass ply 6A has a body portion 6a extending from the tread portion 2 through the side wall portions 3 to bead cores 5 of the bead portions 4, and folded portions 6b which are continuous to both sides of the body portion and are folded outwards from the inside of the tire in the axial direction thereof around the bead cores 5, so as to be engaged. Between this body portion 6a and the folded portion 6b is arranged a bead apex rubber 8 extending in a tapered form outwards in the tire radius direction from the bead core. Thus, the bending rigidity of the bead portion 4 is made high.

The belt layer 7 is made of two or more (two in the present example) belt plies 7A and 7B wherein belt cords are inclined and arranged at an angle of 10° to 35° to the tire circumferential direction. The respective belt plies 7A and 7B are arranged in such a manner that the belt cords are arranged in different directions so as to cross each other in the different plies. As a result, the belt plies exhibit hoop effect. As the belt cords, steel cords are preferred. For example, however, highly-elastic organic fiber cords made of aromatic polyamide fibers, aromatic polyester fibers or the like may be used.

Next, the pneumatic tire 1 is formed by a tire-producing process described hereinafter. This tire-producing process comprises a joint ply forming step S1 (shown in FIG. 2) and a carcass ply forming step S2 (shown in FIG. 3). A raw tire formed by this is vulcanized and shaped in the same way as in the prior art, thereby forming the tire 1.

Figure 2:
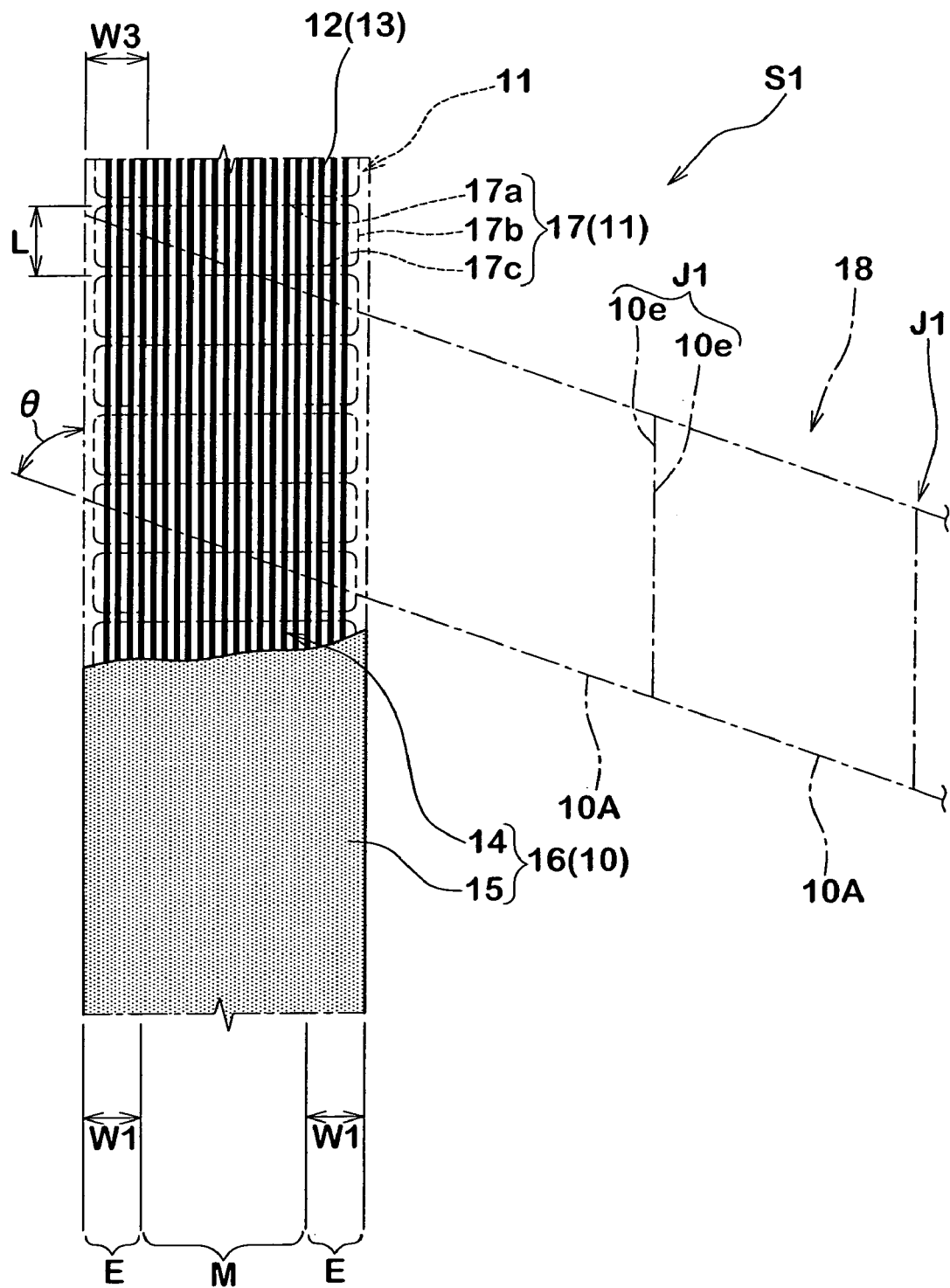
FIG. 2 is a diagram for explaining a joint ply forming step in the process for producing a tire.
Figure 3:
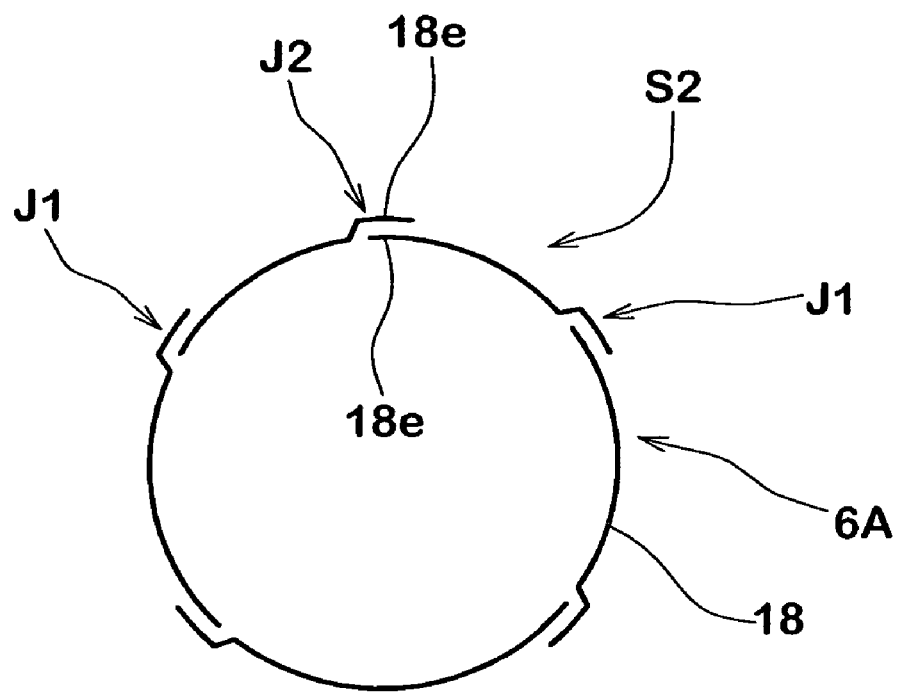
FIG. 3 is a diagram for explaining a carcass ply forming step in the process for producing the tire.

As illustrated in FIG. 2, in the joint ply forming step S1, a joint ply 18 is formed using, as an original fabric, a long rubber-coated fabric 10, two side-edges of which are parallel to each other. The rubber-coated fabric 10 is formed by subjecting a rattan blind woven stuff 14 obtained by weaving fine wefts 11 and warps 12 made of organic fiber carcass cords 13 into a rattan blind form to dipping treatment (adhesive-applying treatment) and then coating both surfaces thereof with a topping rubber 15.

The rubber-coated fabric 10 is cut, at a desired angle θ (about 75 to 90° in any radial tire) to side-edges thereof, into plural cut pieces 10A having a length corresponding to the width of the carcass ply. Thereafter, side-edge side (non-cut side) ends 10 of the respective cut pieces 10A are successively jointed (primary jointing J1), thereby forming the joint ply 18 wherein the carcass cords 13 are arranged at the angle θ to the long direction thereof.

Next, in the carcass ply forming step S2, the joint ply 18 is cut into constant sizes. The resultant cut piece is wound on a drum in the circumferential direction thereof, and further two ends 18e in the circumferential direction of the cut piece are jointed (secondary jointing J2), thereby forming the cylindrical carcass ply 6A.

The matter which is largely different from the prior art is that, as the wefts 11, threads that are far more readily broken as compared with conventional threads, wherein the break elongation thereof is set within the range of 4 to 30% and the break strength thereof is set within the range of 3 to 15 N, are used. The "break elongation" is a maximum elongation (%) when tensile load is gradually applied to the wefts so that the wefts are broken. The measurement thereof is performed under the following conditions: distance between check points: 250 mm, initial load: 0.1 N, and test speed: 300 mm/minute. The strength when the wefts are broken is used as the "break strength".

The break elongation and the break strength can be set within the above-mentioned ranges by adjusting the material, the thickness, the twisted structure etc. of the used organic fibers (examples of which include synthetic fibers, and natural fibers). For example, by using cotton yarn (thickness: No. 20), the break elongation can be set to the range of 5 to 8%, and the break strength can be set to the range of 4 to 5 N.

Another matter different from the prior art is that the wefts 11 are beforehand cut before the carcass ply forming step particularly limited if the timing is before the carcass ply forming step S2 and after the dipping treatment of the rattan blind woven stuff 14. Preferably, the wefts 11 are already cut before the time when the rubber-coated fabric 10 is formed, in order to keep operation efficiency and the quality of the ply, or to make the uniformity and so on better.

The rubber-coated fabric 10 wherein the wefts 11 are beforehand cut can be formed by a production process including a rubber coating step of coating the rattan blind woven stuff 14 with the topping rubber 15 to form a fabric substrate 16, and a weft cutting step of cutting the wefts 11 of this fabric substrate 16 with a pushing cutter 20.

FIG. 2 illustrates, as an example, a case in which the rattan blind woven stuff 14 is obtained by tacking-in type weaving into a rattan blind form. That is, the wefts 11 is made of tacking-in thread pieces 17 composed of a basal portion 17a which goes alternately on and beneath the carcass cords 13 and extends perpendicularly to the carcass cords 13 over almost all of the width of the rattan blind woven stuff 14, and folded portions 17c which extend through secondary portions 17b extending from both ends of the basal portion in parallel to the carcass cords 13, so as to be folded inwards, extended by a small length and terminated. The tacking-in thread pieces 17 are arranged in the longitudinal direction of the carcass cords 13 at a pitch L substantially equal to the length of the secondary portions 17b, thereby forming the wefts.

The length W3 of the folded portions 17c is not particularly limited. However, if the length W3 is too small, the tacking-in thread pieces 17 readily get loose. If the length W3 is too large, the effect of improving the productivity gets small. Therefore, the length W3 is desirably set to at least 20 mm, preferably within the range of 20 to 300 mm, more preferably 30 to 70 mm. In the fabric substrate 16 using this rattan blind woven stuff 14, the basal portion 17a of the weft 11 and the folded portion 17c thereof, the two, overlap with each other in each side-edge area E, which constitutes an area having a width W1 of at least 20 mm from the side-edge of the fabric substrate 16 into the width direction. However, in other portions than the areas E, that is, in a central area M, which is between the side-edge areas E and E, the weft 11 is made of only one of the basal portion 17a.

In the weft cutting step, the wefts 11 of the fabric substrate 16 are cut with the pushing cutter 20. The fabric substrate 16 is already coated with the topping rubber 15; therefore, even if the wefts 11 are cut at this stage, inconveniences such that the arrangement of the carcass cords 13 are disturbed do not arise.

Figure 4:
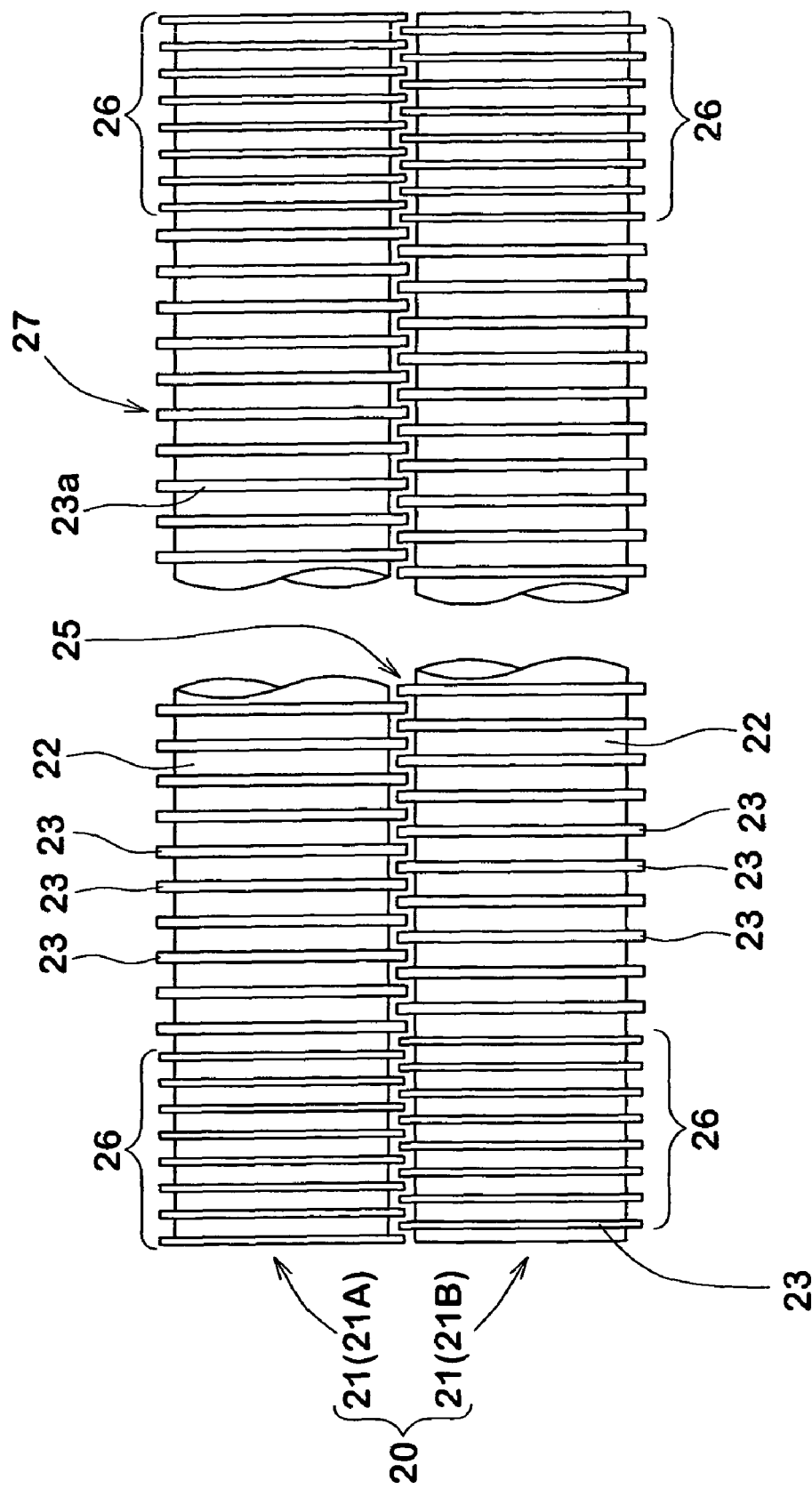
FIG. 4 is a front view of a pushing cutter, FIGS. 5(A) and (B) are an enlarged sectional view of the pushing cutter, and a sectional view of a fabric substrate, FIGS. 6(A) and (B) are sectional views of a rubber-coated fabric to show a situation that wefts are cut.

For example, as illustrated in FIG. 4, the pushing cutter 20 comprises a pair of comb-teeth form rollers 21 and 21 arranged in parallel to each other. In each of the comb-teeth form rollers 21, a cylindrical basal axial portion 22 thereof extending in the axial direction has rib-form pushing nail portions 23 projecting from the circumferential surface thereof and extending in the circumferential direction, the pushing nail portions 23 being arranged at intervals in the axial direction. In each of the comb-teeth form rollers 21, both ends thereof are rotatably supported by non-illustrated bearings, and further the rollers are rotated and driven in directions reverse to each other by means of a motor or the like.

In the pushing cutter 20, the outer circumferential face 23a of the pushing nail portions 23 of one 21A of the comb-teeth form rollers is faced with the inside of concave portions between the pushing nail portions 23 and 23 of the other comb-teeth form roller 21B in such a manner that they do not contact each other. In this way, the pushing nail portions 23 facing each other are engaged with each other, and a gap 25 which is continuous in a convex and concave form in the axial direction is formed between the pair of the comb-teeth form rollers 21A and 21B.

Figure 11:
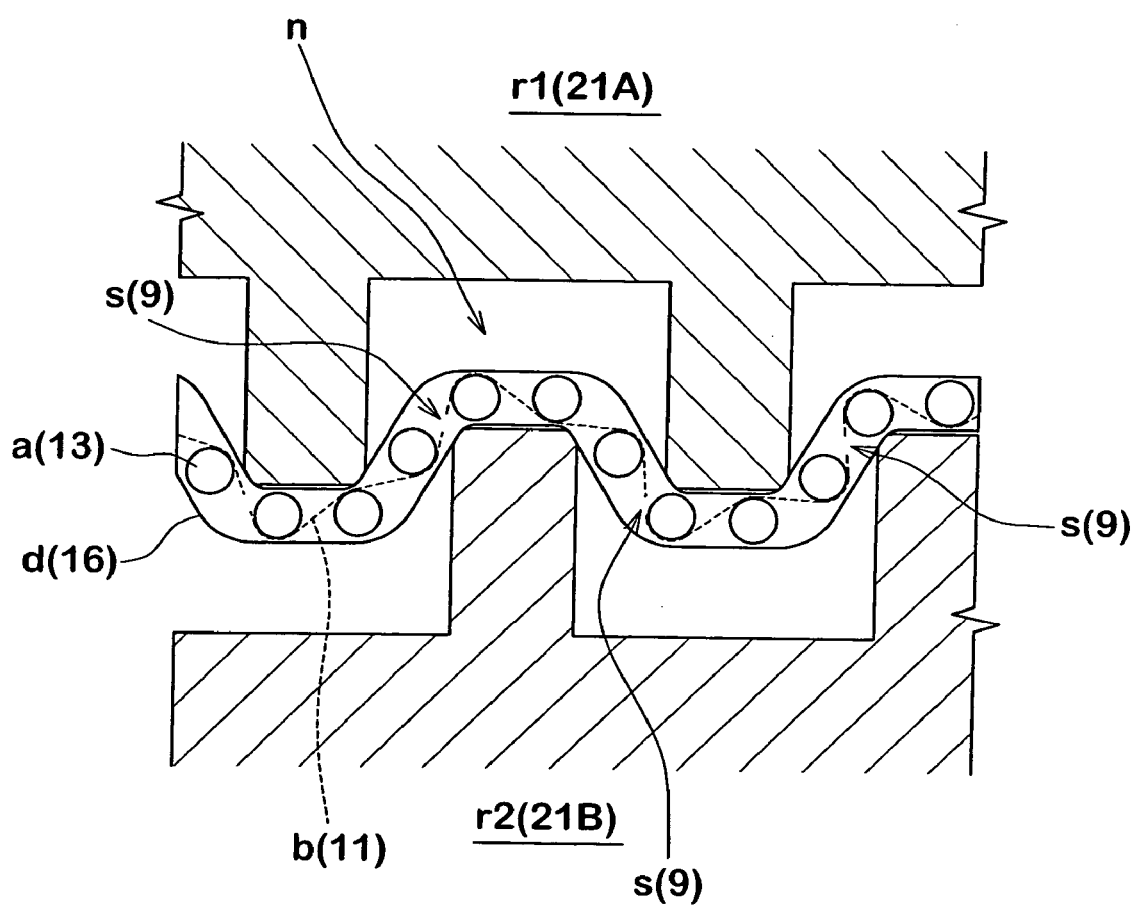
FIG. 11 is an enlarged sectional view illustrating a pushing and cutting step.

The fabric substrate 16 is passed through this gap 25. At this time, the wefts 11 are set in a direction parallel to the axial direction of the comb-teeth form rollers 21. In this way, the fabric substrate 16 is stretched into a wave form and a tension is applied thereto, as illustrated in FIG. 11. By combination of this operation with the matter that the break elongation and the break strength of the wefts 11 are small, cut portions 9 of the wefts 11 can be surely cut at a desired fine cut pitch CP corresponding to the formation pitch of the pushing nail portions 23. It is sufficient that the engaged height y between the rollers 21 and 21 is small; therefore, the disturbance of the cords after being cut and the waving of the fabric substrate 16 can be suppressed at a low level. In the cut portions 9, for example, at portions where two of the wefts 11 overlap in the side-edge areas E, it is sufficient that at least one thereof is cut.

Since the wefts 11 are beforehand cut in this way, it is possible to suppress the matter that the wefts 11 are stretched in the circumferential direction at the time of shaping the carcass ply so that power having a direction along which the joint portions J are opened acts on the portions J. Even if the length of the wefts 11 after being cut is long to some degree, the break elongation and the break strength of the wefts 11 are small; therefore, the wefts 11 are automatically cut by tension at the time of the shaping, so that the opening-direction power which acts on the joint portions J gets small.

In the case that the break elongation of the wefts 11 is more than 30% and the break strength is more than 15 N, the wefts 11 are not readily cut with the pushing cutter 20 so as to bring a risk that the joint portions J are opened at the time of the shaping. If the break elongation is less than 4% and the break strength is less than 3 N, the wefts are readily broken when the wefts are woven into a rattan blind form or subjected to dipping treatment. As a result, cord-disturbance is caused. Thus, the wefts do not exhibit their original function. From such a viewpoint, the break elongation is preferably from 4 to 25%, more preferably from 4 to 15%, and still more preferably from 4 to 10%. The break strength is preferably from 3 to 13 N, more preferably from 3 to 10 N, and still more preferably 3 to 7 N.

Figure 7:
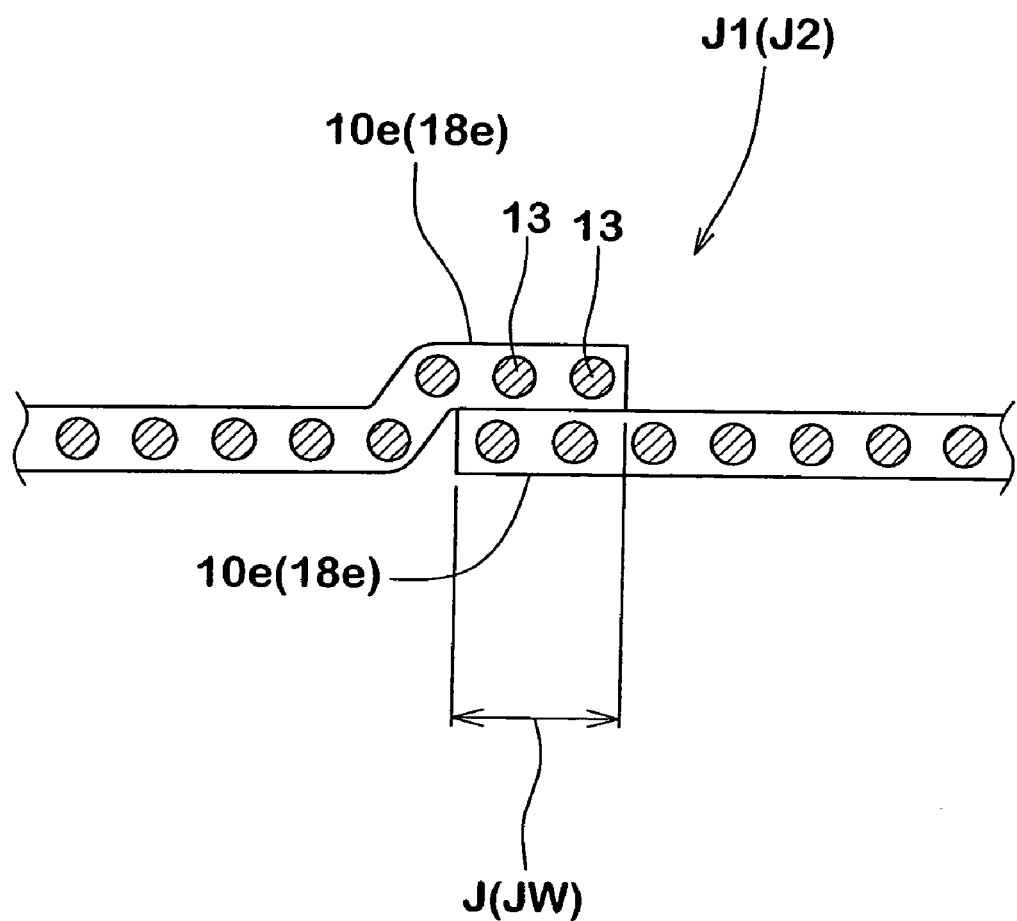
FIG. 7 is a sectional view of a case in which joint portions are overlap joints, FIGS. 8(A) and (B) are a sectional view of a case in which joint portions are butt joints, and a diagram illustrating a joint method thereof, FIGS. 9(A) and (B) are diagrams for explaining the formation of a conventional carcass ply.
Figure 8A:
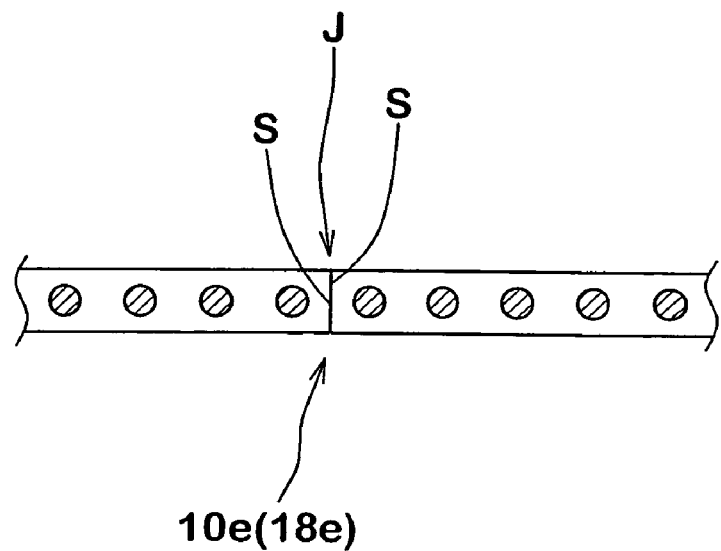

The opening-direction power which acts on the joint portions J gets small. In the present invention, therefore, even if the primary jointing J1 and the secondary jointing J2 are made up to be overlap joints, the jointing can be attained in such a manner that three or more carcass cords 13 do not overlap vertically, that is, so as to have such a width JW that the number of the overlapping carcass cords 13 is two or less, as illustrated in FIG. 7. As illustrated in FIG. 8(A), respective end faces S of the ends 10e and 10e (or respective end faces 18e and 18e of the ends 18e) can be butted and jointed, whereby a butt joint in which the number of the overlapping carcass cords 11 is zero can be adopted.

It is therefore possible to keep joint strength necessary for the joint portions J and simultaneously decrease the jointing width largely, so as to improve the uniformity while decreasing poor appearances such as budges and dents.

Figure 8B:
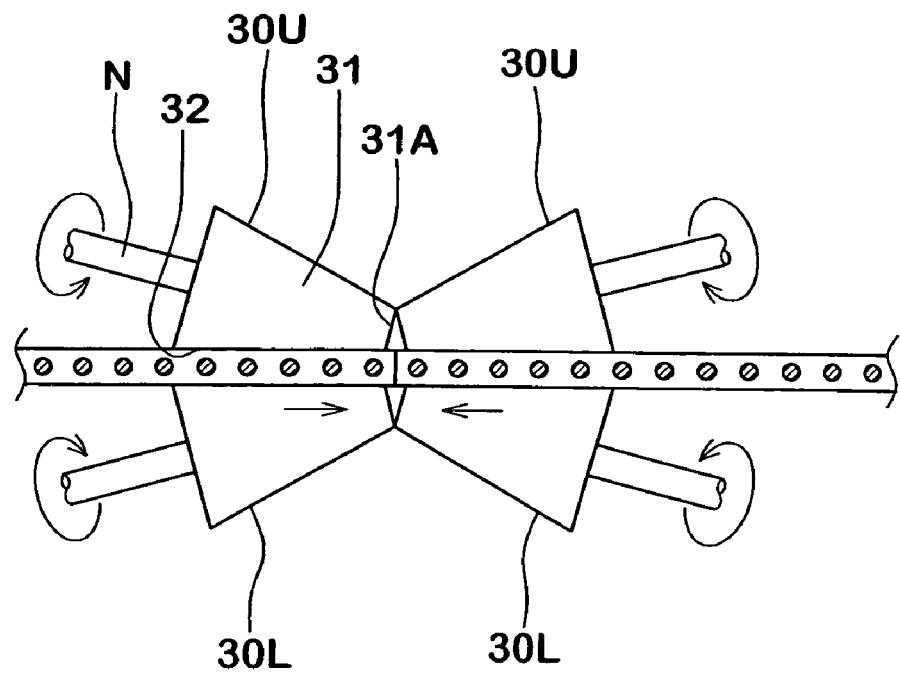
Figure 9A:
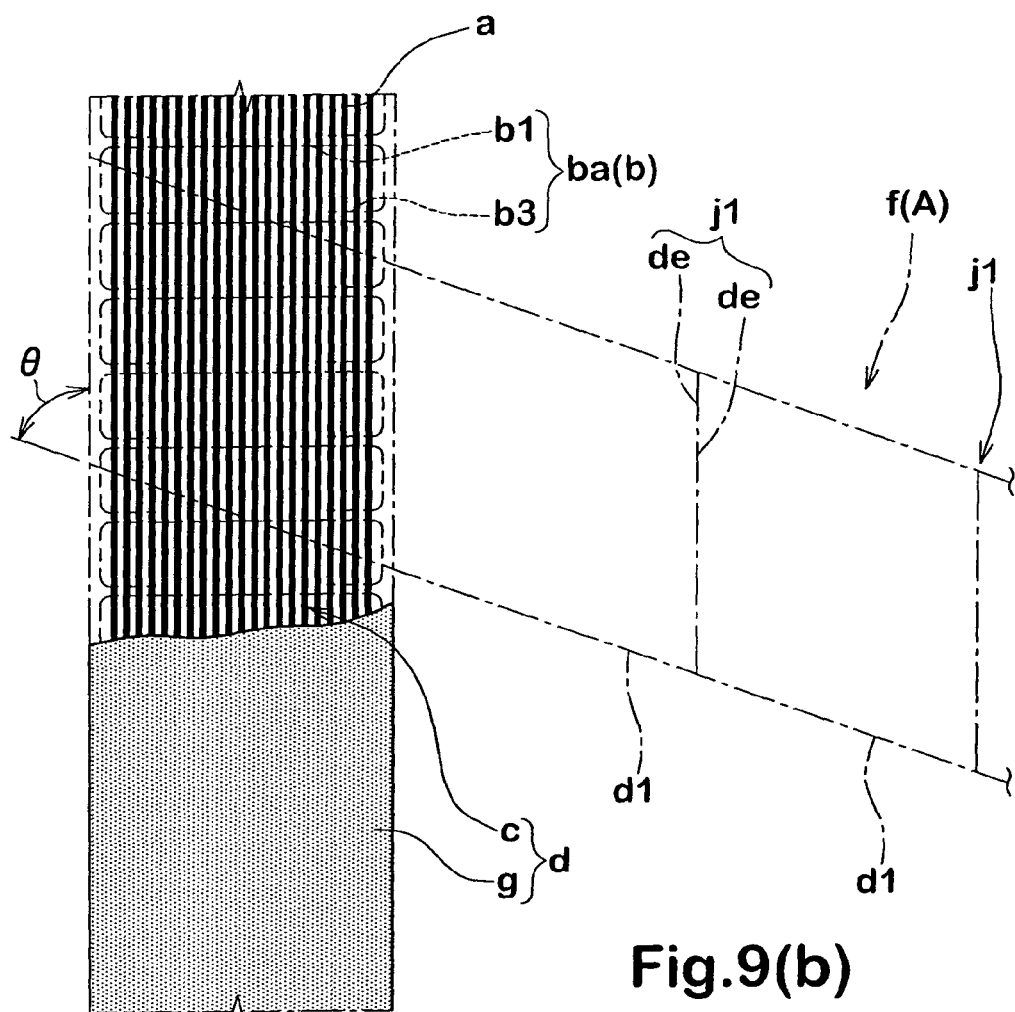
Figure 9B:
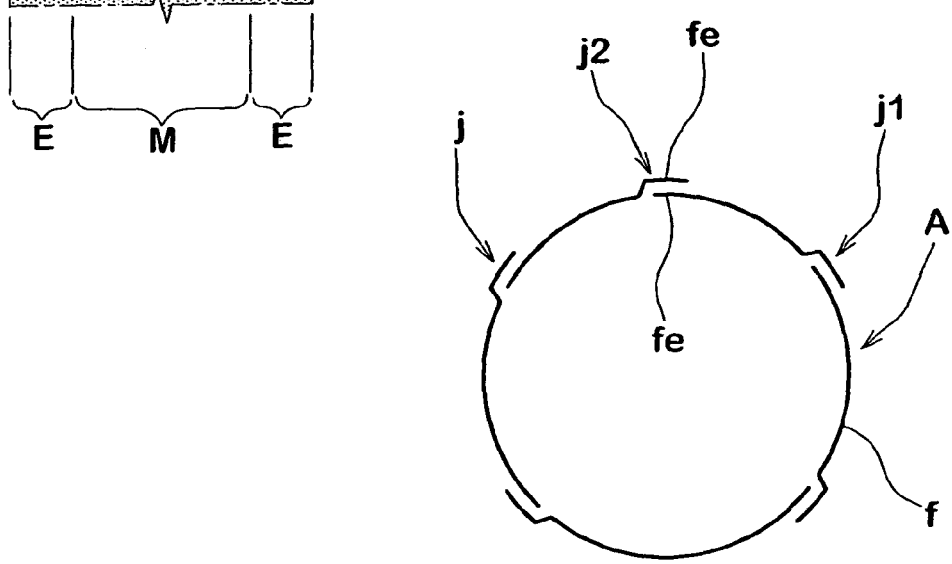
Figure 10:
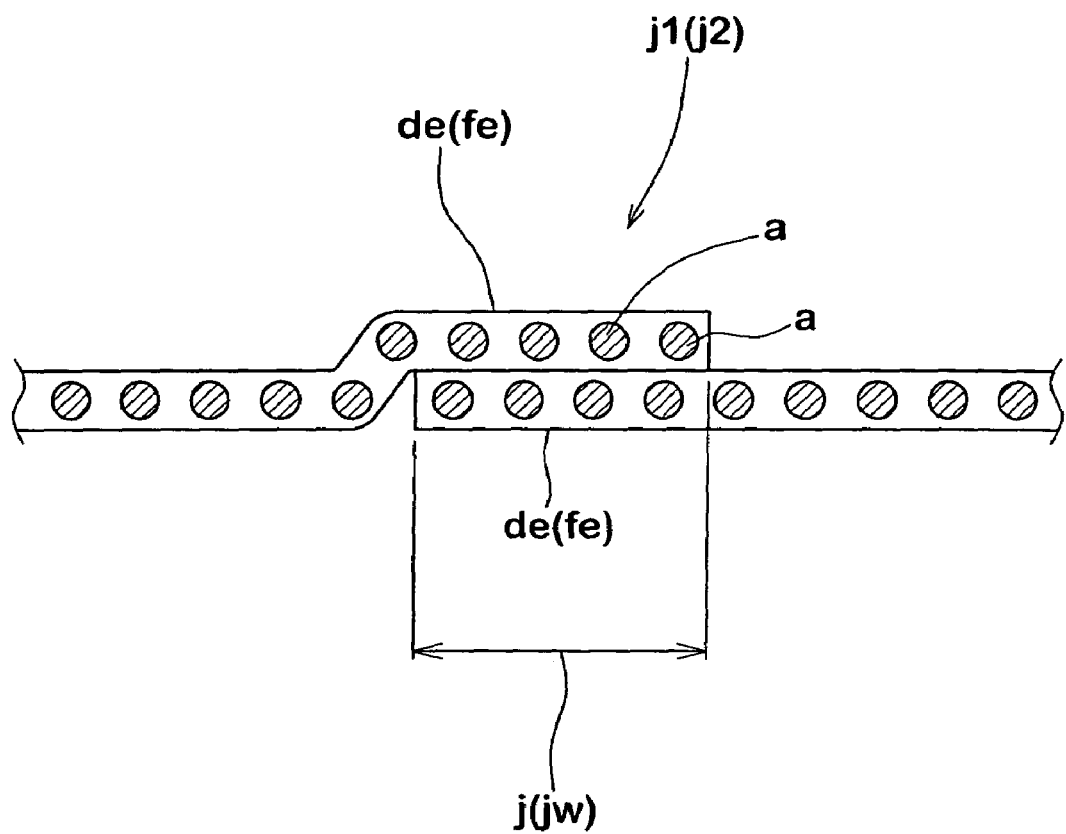
FIG. 10 is a sectional view for explaining joint portions at this time.

In the above-mentioned butt joint, in order to make the pressure-bonding power to the respective end faces S, it is preferred to use a pair of upper conical comas 30U and 30U and a pair of lower conical comas 30L and 30L, as illustrated in FIG. 8(B), to bond the joint portions. About the comas, the upper comas 30U are described as a representative. The comas are arranged in such a manner that minimum diameter portions 31A of their conical faces 31 are brought near each other and further rotary axial cores N are inclined at such an angle that the lowest generating line 32 of each of the conical faces 31 is parallel to the ply. The comas 30 are controlled to be rotated at the same speed. In the rotation, the comas 30 are urged in a direction along which the respective end faces S and S are butted against each other. In this way, the joint strength can be made high.

As a result of research by the inventor, the following has been proved: in order to make the uniformity and so on higher, as illustrated in FIGS. 6(A) and (B), it is preferred that the cut pitch CP2 in the side edge areas E of the fabric 10 is made smaller than the cut pitch CP1 in the central area M rather than the cut pitch CP of the wefts 11 is made constant (even) over the entire width of the fabric 10.

The reason for this is as follows: The power of the cut wefts 11 for restraining the carcass cords 13 is higher in the side edge areas E than in the central area M, as described above, so that the intervals between the carcass cords become uneven, for example, the intervals in the side edge areas E become dense and the intervals in the central area M become thin at the time of the shaping; therefore, a bad effect is produced on the uniformity. In particular, in the case that the rattan blind woven stuff 14 is of the above-mentioned tacking-in type, two of the wefts 11 overlap in the side edge areas E. Thus, the tendency of the deterioration in the uniformity gets more intense. It is therefore preferred to set the ratio between the cut pitches, CP1/CP2, to less than 1.0.

Figure 5A:
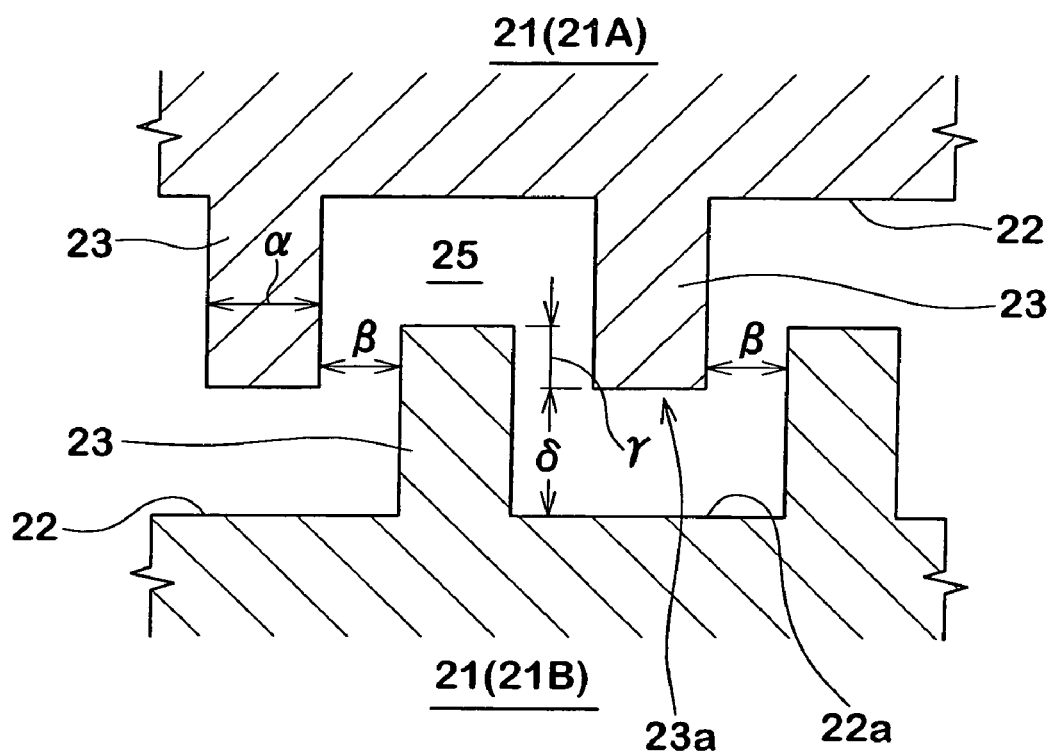
Figure 5B:
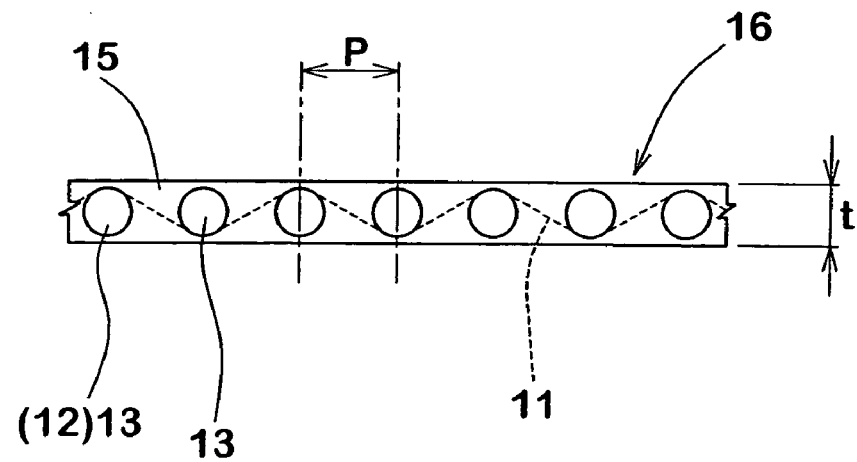

For this purpose, as illustrated in FIG. 4, in the comb-teeth form roller 21 of the present example, the width α of the pushing nail portions 23 in the axial direction and the separate distance β between the pushing nail portions 23 which engage with each other are smaller in two end portions 26 for pushing and cutting the side edge areas E of the fabric substrate 16 than in a central portion 27 for pushing and cutting the central area M, as illustrated in FIG. 5(A). The width W1 of the side edge area E from the side edge is preferably from 20 to 300 mm, more preferably from 30 to 70 mm.

In the central portion 27, the width a of the pushing nail portions 23 is desirably set to about 1.4 to 1.6 times the pitch P of the embedded carcass cords 13 in the fabric substrate 16, as illustrated in FIG. 6(B). In the central portion 27, the separate distance β is desirably set to 1.4 to 1.7 times, more preferably 1.45 to 1.60 times the thickness t of the fabric substrate 16. In the central portion 27, the engaging height γ, which is an overlapping height in the radius direction of the pushing nail portions which engage with each other, is desirably set to about 1.4 to 2.0 times, more preferably about 1.6 to 1.8 times the pitch β of the embedded carcass cords 13. The distance δ in the radius direction between the outer circumferential face 23a of the pushing nail portion 23 and the outer circumferential face 22a of the basal axial portion 22 is preferably set to about 1.1 to 5.0 times the thickness t of the fabric substrate 16 in order to pass the fabric substrate 16 smoothly therebetween.

According to this central portion 27 of the comb-teeth form roller, the central area M of the fabric substrate 16 is pushed and cut. Thus, as illustrated in FIG. 6(A), the wefts 11 can be cut at a cut pitch CP1 which is about 3 to 5 times the pitch P of the embedded carcass cords 13. This cut pitch CP1 may not be constant if the cut pitch is within the above-mentioned range.

On the other hand, at the two end portions 26 and 26 of the comb-teeth form roller 21, it is desired that the width α of the pushing nail portion 23 is set to about 0.8 to 1.2 times the pitch P and the separate distance β is set to about 1.2 to 1.3 times the thickness t. As a result, in the two end portions 26 and 26, the wefts 11 can be cut at a cut pitch CP2 which is within the range of 1 to 5 times, more preferably 2.5 to 3.5 times the pitch β and is smaller than the cut pitch CP1, as illustrated in FIG. 6(B).

The engaging height γ in the two end portions 26 is not particularly limited. However, if the height is too large, the carcass cords 13 are readily loosened. If the height is too small, the effect of pushing and cutting the wefts 11 is apt to be lowered. Thus, the engaging height γ is desirably set to about 0.8 to 1.5 times, more preferably 1.0 to 1.2 times the pitch P of the embedded carcass cords 13. The distance δ is set to a distance substantially equal to that in the central portion 27.

As described above, in the present example, the cut pitch CP2 of the wefts 11 in the side edge areas E is made smaller than the cut pitch CP1 in the central area M; therefore, the power of the cut wefts for restraining the carcass cords 13 can be decreased in the side edge areas E. When the carcass ply is shaped, the interval between the carcass cords can be made uniform. As a result, the uniformity can be still more improved. For the improvement in the uniformity, the ratio between the cut pitches, CP1/CP2, is preferably set within the range of 1.1 to 2.0, more preferably 1.2 to 1.4.

The above has described particularly preferred embodiments of the present invention. However, the present invention is not limited to the illustrated embodiments, and can be made into various embodiments and carried out.

EMBODIMENT A

Radial tires (tire size: 195/65R15) for passenger cars wherein a rubber-coated fabric having a basic structure illustrated in FIG. 1 and each specification shown in Table 1 was used for a carcass ply were produced by way trial on the basis of the tire-producing process of the present invention, and further the uniformity and the appearance quality of the respective trial tires were tested. In the embodiment A, the wefts in the side edge areas of the rubber-coated fabric and the wefts in the central area were cut at the same cut pitch CP.

(1) Uniformity:

According to JASOC607 (method for testing the uniformity of tires for cars), the low-speed RFV, the high-speed RFV and the high-speed TFV of the trial tires (the number of each thereof: 5) were measured under an internal pressure of 200 kPa and a load of 4510 N. They are shown as average values. The low-speed value is a value when the circumferential speed was 7 km/h, and the high-speed value is a value when the circumferential speed was 120 km/h.

(2) Appearance Quality:

An internal pressure (200 kPa) was applied to each of the trial tires, and the degree that bulges and dents were generated in the side wall surface thereof was subjected to functional evaluation by inspector's visual observation. The evaluation is shown by five scores. As the value is larger, the appearance is better.

TABLE 1

|  | Comparative Example | Example A1 |
|---|---|---|
| Carcass cords |  |  |
| Material | Polyester | Polyester |
| Thickness | 1500 dtex/2 | 1500 dtex/2 |
| Wefts |  |  |
| Material | Polyester/cotton | Cotton |

TABLE 1-continued

|  | Comparative Example | Example A1 |
|---|---|---|
| Thickness | Corresponding to 700 dtex | No. 20 |
| Break elongation (%) | 100 | 5 |
| Break strength (N) | 5 | 5 |
| Joint type | Overlap joint | Overlap joint |
| (The number of the overlapping cords) | 5 | 1 |
| Step of cutting the wefts | Not carried out | Carried out |
| Separation of the joint portion(s) | Not carried out | Not carried out |
| Uniformity |  |  |
| Low-speed RFV <N> | 60 | 50 |
| High-speed RFV <N> | 120 | 100 |
| High-speed TFV <N> | 80 | 40 |
| Appearance quality | 3 | 4.5 |

As shown in Table 1, in the embodiment A1, the break elongation and the break strength of the wefts were decreased into the given range and further the wefts were beforehand cut with comb-teeth form rollers. Therefore, the jointing width thereof was able to be largely decreased while a necessary jointing strength was kept. Thus, it was proved that the appearance quality and the uniformity thereof were improved.

EMBODIMENT B

As described in Table 2, the width α of the pushing nail portions at two end portions of each comb-teeth form roller and the separate distance β, and the engaging height γ were varied, and radial tires (tire size: 195/65R15) for passenger cars using, as a carcass ply, a rubber-coated fabric wherein the weft cut pitch CP2 in the side edge areas and the weft cut pitch CP1 in the central area were made different were produced by way trial on the basis of the tire-producing process of the present invention, and further the uniformity and the appearance quality of the respective trial tires were tested.

(1) Uniformity:

According to JASOC607, the high-speed RFV (circumferential speed: 140 km/h) of each of the trial tires was measured under an internal pressure of 200 kPa and a load of 4510 N. The results are shown as indexes obtained by regarding the result of Example A2 as 100. As the value is larger, the result is better.

(2) Appearance Quality:

An internal pressure (300 kPa) was applied to each of the trial tires, and the degree that bulges and dents were generated in the side wall surface thereof and the waving state (undulation) of the side wall surface waved were synthetically judged by inspector's visual observation and by his sense of touch. The results are shown as indexes obtained by regarding the result of Example A2 as 100. As the value is larger, bulges, dents and undulation are more inconspicuous so that the results are better.

TABLE 2

|  |  | Example A2 | Example B1 | Example B2 | Example B3 | Example B4 | Example B5 |
|---|---|---|---|---|---|---|---|
| Wefts | Material | Cotton | Cotton | Cotton | Cotton | Cotton | Cotton |
|  | Break elongation (%) | 10 | 10 | 10 | 10 | 10 | 10 |
|  | Break strength (N) | 10 | 10 | 10 | 10 | 10 | 10 |
|  | Magnitude between cut pitches CP1 and CP2 | CP1 ≈ CP2 | CP1 > CP2 | CP1 > CP2 | CP1 > CP2 | CP1 > CP2 | CP1 > CP2 |
| Side edge areas width W1 (mm) | | 0 | 20 | 300 | 50 | 50 | 50 |
| Specification of comb-teeth rollers | Two end portions α | 1.5 P | 1.0 P | 1.0 P | 0.8 P | 0.7 P | 1.2 P |
|  | β | 1.5 t | 1.25 t | 1.25 t | 1.2 t | 1.1 t | 1.3 t |
|  | γ | 1.6 P | 1.2 P | 1.2 P | 0.8 P | 0.7 P | 1.5 P |
|  | Central portion α | 1.5 P | 1.5 P | 1.5 P | 1.5 P | 1.5 P | 1.5 P |
|  | β | 1.5 t | 1.5 t | 1.5 t | 1.5 t | 1.5 t | 1.5 t |
|  | γ | 1.6 P | 1.6 P | 1.6 P | 1.6 P | 1.6 P | 1.6 P |
| Test results | Bulges and dents (index) | 100 | 120 | 120 | 120 | 110 | 105 |
|  | Undulation (index) | 100 | 120 | 110 | 100 | 95 | 110 |
|  | Uniformity (index) | 100 | 120 | 120 | 120 | 110 | 110 |

As shown in Table 2, in embodiments B1 to B5, the weft cut pitch CP2 in the side edge areas was made smaller than the weft cut pitch CP1 in the central area; therefore, it was proved that the distance between the carcass cords was made more uniform when the tire was inflated and bulges, dents and the uniformity were more improved as compared with embodiment A2, wherein the pitch was constant (CP1≈CP2). In embodiment B4, the width α of the pushing nail portions and the separate distance β in the comb-teeth form rollers were too small. Thus, the wave deformation of the fabric substrate was intense so that the undulation was lowered.

INDUSTRIAL APPLICABILITY

As described above, the rubber-coated fabric according to the present invention is useful for forming a carcass ply of a pneumatic tire, and is helpful in decreasing poor appearances of the tire, such as bulges and dents, and improving the uniformity.

The invention claimed is:

1. A rubber-coated fabric for a tire, obtained by rubber-coating a rattan blind woven stuff in which wefts and warps made of tire cords are woven into a rattan blind form,
wherein the wefts have cut portions obtained by being cut after the rubber-coating, have a break elongation of 4 to 30%, and have a break strength of 3 to 15 N, and
wherein the cut pitch between the cut portions in side edge areas, which are areas having a width of at least 20 mm from each side edge of the rubber-coated fabric, is smaller than the cut pitch between the cut portions in a central area between the side edge areas.

2. The rubber-coated fabric for a tire according to claim 1, wherein the cut pitch in the side edge areas is from 1 to 4 times the embedding pitch of the tire cords, and the cut pitch in the central area is from 3 to 5 times the embedding pitch of the tire cords.

3. The rubber-coated fabric for a tire according to any one of claims 1 or 2, wherein in that in the wefts, plural tacking-in thread pieces composed of a basal portion which extends over almost all of the width of the rattan blind woven stuff, and folded portions which extend, through secondary portions extending from both ends of the basal portion in parallel to the tire cords, so as to be folded inwards and terminated at the side edge areas are arranged at a pitch interval substantially equal to the length of the secondary portions in the warp direction.

4. A process for producing the rubber-coated fabric for a tire according to claim 1,
comprising a rubber-coating step of coating a rattan blind woven stuff obtained by weaving wefts and warps made of tire cords into a rattan blind form with a rubber, thereby forming a fabric substrate, and a weft-cutting step of cutting the wefts of this fabric substrate with a pushing cutter,
wherein in the pushing cutter a pair of comb-teeth form rollers in which rib-form pushing nail portions extending in the circumferential direction are arranged at intervals in the axial direction to face each other in parallel and in such manner that the pushing nail portions of one of the comb-teeth rollers do not contact the inside of concave portions between the pushing nail portions of the other comb-teeth form roller, whereby the pushing cutter has a gap which is continuous in a convex and concave form in the axial direction between the comb-teeth form rollers, and the fabric substrate is passed, in a direction along which the wefts are parallel to the axial direction of the comb-teeth form rollers, between this gap, and wherein the width a of the pushing nail portions in the axial direction and the separate distance β of the pushing nail portions adjacent to each other in the axial direction in both end portions in the axial direction of the comb-teeth form rollers are made smaller than the width a and the separate distance β in the central portion thereof, respectively.

5. A process for producing a pneumatic tire wherein the rubber-coated fabric according to claim 1 is used as a carcass ply, comprising:
a joint ply forming step of primarily-jointing side-edge side ends of cut pieces obtained by cutting the rubber-coated fabric in a direction which crosses the side-edges of the fabric, thereby forming a joint ply, and
a carcass ply forming step of winding the joint ply in the circumferential direction on a drum and secondarily-jointing both ends in the circumference direction of this joint ply, thereby forming a cylindrical carcass ply,
wherein the wefts are cut before the carcass ply forming step, and
in each of the joint portions resulting from the primary jointing and the secondary jointing, three or more carcass cords do not overlap vertically.

6. The process for producing the pneumatic tire according to claim 5, wherein jointing portions resulting from the primary jointing and/or the secondary jointing are butt joints wherein the end faces of the ends are butted and jointed.

7. A pneumatic tire, characterized by being produced by the production process according to claim 5.

* * * * *